United States Patent
Lee et al.

(10) Patent No.: US 9,266,203 B2
(45) Date of Patent: Feb. 23, 2016

(54) PART BEING CENTERED DURING ASSEMBLY PROCESS, WAFER LEVEL PARTS ASSEMBLY, AND APPARATUS AND METHOD TO MANUFACTURE WAFER LEVEL PARTS ASSEMBLY

(75) Inventors: Eun-sung Lee, Daejeon (KR); Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1622 days.

(21) Appl. No.: 12/488,180

(22) Filed: Jun. 19, 2009

(65) Prior Publication Data
US 2010/0050412 A1    Mar. 4, 2010

(30) Foreign Application Priority Data
Sep. 2, 2008   (KR) .................. 10-2008-0086339

(51) Int. Cl.
| | | |
|---|---|---|
| *G02B 3/00* | (2006.01) | |
| *B23P 19/00* | (2006.01) | |
| *B23P 19/10* | (2006.01) | |
| *G02B 7/00* | (2006.01) | |
| *G02B 7/02* | (2006.01) | |
| *G02B 13/18* | (2006.01) | |

(52) U.S. Cl.
CPC ............... *B23P 19/10* (2013.01); *G02B 7/003* (2013.01); *G02B 7/02* (2013.01); *G02B 13/18* (2013.01); *Y10T 29/49826* (2015.01); *Y10T 29/53* (2015.01)

(58) Field of Classification Search
CPC .......... G02B 13/18; G02B 13/24; G02B 7/02; G02B 7/003; G02B 7/00; G02B 3/00; Y10T 29/49895; Y10T 29/53; B23P 19/10
USPC .............. 359/717, 793, 794, 795, 796, 809; 29/700, 464
See application file for complete search history.

(56) References Cited

U.S. PATENT DOCUMENTS

| | | | | |
|---|---|---|---|---|
| 6,058,095 | A * | 5/2000 | Yamamoto et al. | 369/112.23 |
| 7,012,767 | B2 * | 3/2006 | Yamamoto et al. | 359/811 |
| 7,414,423 | B2 * | 8/2008 | Lu et al. | 324/762.06 |
| 7,589,033 | B2 * | 9/2009 | Lu et al. | 438/800 |

(Continued)

FOREIGN PATENT DOCUMENTS

| | | |
|---|---|---|
| JP | 56149010 A | 11/1981 |
| JP | 2005141091 A | 6/2005 |

(Continued)

OTHER PUBLICATIONS

Communication, dated Jul. 17, 2014, issued by the Korean Intellectual Property Office in counterpart Patent Application No. 10-2008-0086339.

(Continued)

*Primary Examiner* — Essama Omgba
(74) *Attorney, Agent, or Firm* — Sughrue Mion, PLLC

(57) ABSTRACT

A part to be centered during an assembly process includes an effective portion which performs a function and is shaped for insertion into a hole, a reference portion extended from the effective portion and formed substantially perpendicular to a center axis of the effective portion, and an aligning portion extended from the effective portion and formed around the effective portion. When the effective portion of the part is inserted into the hole, a center of the effective portion is automatically aligned with a centerline of the hole.

15 Claims, 10 Drawing Sheets

(56) References Cited

U.S. PATENT DOCUMENTS

| | | | |
|---|---|---|---|
| 7,965,445 B2* | 6/2011 | Chen et al. | 359/619 |
| 8,179,619 B2* | 5/2012 | Kuwa et al. | 359/811 |
| 2003/0095343 A1* | 5/2003 | Feldman et al. | 359/796 |
| 2006/0056074 A1* | 3/2006 | Yamamoto et al. | 359/796 |
| 2006/0077786 A1* | 4/2006 | Hendriks et al. | 369/44.23 |
| 2007/0230182 A1* | 10/2007 | Tai et al. | 362/294 |
| 2008/0136434 A1* | 6/2008 | Lu et al. | 324/758 |
| 2008/0280382 A1* | 11/2008 | Lu et al. | 438/16 |
| 2010/0002315 A1* | 1/2010 | Kuwa et al. | 359/811 |
| 2010/0328788 A1* | 12/2010 | Shyu et al. | 359/818 |
| 2011/0026144 A1* | 2/2011 | Shyu et al. | 359/819 |
| 2011/0075264 A1* | 3/2011 | Chen et al. | 359/619 |
| 2013/0148363 A1* | 6/2013 | Choquet et al. | 362/311.02 |
| 2013/0258503 A1* | 10/2013 | Lu | 359/819 |

FOREIGN PATENT DOCUMENTS

| | | | | |
|---|---|---|---|---|
| JP | 2007279557 A | * | 10/2007 | G02B 7/02 |
| KR | 10-2005-0048635 A | | 5/2005 | |
| WO | WO 03027746 A1 | * | 4/2003 | G02B 7/00 |

OTHER PUBLICATIONS

Communication dated Feb. 24, 2015, issued by the Korean Intellectual Property Office in counterpart Korean Application No. 10-2008-0086339.

* cited by examiner

PART BEING CENTERED DURING ASSEMBLY PROCESS, WAFER LEVEL PARTS ASSEMBLY, AND APPARATUS AND METHOD TO MANUFACTURE WAFER LEVEL PARTS ASSEMBLY

CROSS-REFERENCE TO RELATED APPLICATIONS

This application claims priority from Korean Patent Application No. 2008-86339 filed Sep. 2, 2008 in the Korean Intellectual Property Office, the disclosure of which is incorporated herein by reference in its entirety.

BACKGROUND OF THE INVENTION

1. Field of the Invention

Methods and apparatuses consistent with the present invention provide a part which requires centering during an assembly process and a method of centering the part, and more particularly, to producing a part having a shape that allows a plurality of the parts to be formed as a wafer level parts assembly, and apparatuses and methods to manufacture the wafer level parts assembly.

2. Description of the Related Art

Generally, products requiring an assembly process in which a plurality of small parts is stacked up may use a plurality of interim assemblies when the products are assembled. In other words, the interim assembly is formed so that the plurality of small parts is arranged integrally on the same plane, and a plurality of interim assemblies is stacked up to assemble. After that, the assembled interim assemblies are cut so a plurality of separate products is completed.

For example, when manufacturing a lens module for use with a cellular phone having a camera function, a lens barrel is formed, and then a plurality of optical lens is stacked up inside the lens barrel. However, when the plurality of optical lenses is stacked up one by one within the lens barrel, each of the plurality of optical lenses needs to be centered with the center of the lens barrel. Therefore, much time is required to manufacture the lens module, and there is a high potential for errors to occur. In general, a centering error of approximately 2 μm (micrometers) or less is required during the assembly process of the lens module.

For reducing assembly time and minimizing centering error, forming a plurality of optical lenses as a wafer level lens assembly in which the plurality of optical lenses is formed integrally on the same plane is desirable.

A plurality of wafer level lens assemblies is stacked up to form a lens module array constituted of a plurality of lens modules. After that, the lens module array is cut to at once form the plurality of separated lens modules.

When parts to be centered during assembly process are assembled to make an end product, forming the parts as a wafer level parts assembly and assembling a plurality of wafer level parts assemblies to make an end product may increase productivity.

Therefore, it is required to develop parts shapes which allow the parts to be efficiently and precisely formed as a wafer level parts assembly, and an apparatus and a method to manufacture the wafer level parts assembly.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a part to be centered during an assembly process that can be efficiently and precisely formed as a wafer level parts assembly, and a wafer level parts assembly formed using the same.

The present invention also provides an apparatus and a method to manufacture a wafer level parts assembly.

According to an aspect of the present invention, a part to be centered during assembly process may include an effective portion which performs a function and has a shape capable of being inserted into a hole; a reference portion extended from the effective portion and formed substantially perpendicular to a center axis of the effective portion; and an aligning portion extended from the effective portion and formed around the effective portion.

The aligning portion may be formed around a periphery of the effective portion.

The effective portion may be formed so that some of the effective portion functions as the aligning portion.

The aligning portion may include an inclined surface formed at a portion of the part to contact an edge of a hole when the part is inserted into the hole.

The aligning portion may be formed on a top surface of the part.

The part to be centered during an assembly process may include an inclination preventing portion formed around a periphery of the aligning portion in a direction in which the part is inserted into the hole and to prevent the part from inclining.

The part to be centered during assembly process may include an optical lens.

According to another aspect of the present invention, a wafer level parts assembly may include: a base plate formed in size and shape of a wafer having a plurality of through holes formed by regular intervals; and a plurality of parts inserted into the plurality of through holes and bonded to the base plate. Each of the plurality of parts may include an effective portion positioned either above the through hole or within the through hole; a reference portion extended from the effective portion and formed substantially perpendicular to a center axis of the effective portion; and an aligning portion extended from the effective portion and formed around the effective portion.

The reference portion of each of the plurality of parts may be bonded to the base plate.

According to another aspect of the present invention, a manufacturing apparatus that bonds a plurality of parts to be centered during an assembly process to a base plate to form a wafer level parts assembly, each of the plurality of parts including an effective portion which performs a function and has a shape capable of being inserted into a hole; a reference portion extended from the effective portion and formed substantially perpendicular to a center axis of the effective portion; and an aligning portion extended from the effective portion and formed around the effective portion; the manufacturing apparatus may include: an alignment jig having a plurality of aligning reference portions formed at regular intervals to support the aligning portions of the parts and a top surface formed in a plane perpendicular to centerlines of the plurality of aligning reference portions; and an alignment guide jig disposed above the alignment jig, a bottom surface of the alignment guide jig facing the alignment jig formed parallel to the top surface of the alignment jig.

The alignment jig may be made by an exposure technique of a semiconductor manufacturing process.

The aligning reference portion of the alignment jig may be formed of photoresist.

The plurality of parts may be molded by a part mold made using concentric rotation member machining techniques.

The manufacturing apparatus may include a component fixing apparatus to fix the plurality of parts arranged on the alignment jig.

The manufacturing apparatus may include an alignment auxiliary apparatus to allow the plurality of parts to be accurately arranged on the plurality of aligning reference portions of the alignment jig.

The alignment auxiliary apparatus may include an air blower, and a vibrator.

According to another aspect of the present invention, a method to manufacture a wafer level parts assembly may include: preparing a plurality of parts to be centered during an assembly process; arranging the plurality of parts on an alignment jig; preparing a base plate to bond to the plurality of parts; bonding the base plate to the plurality of parts; and separating the base plate from the alignment jig; wherein each of the plurality of parts may include; an effective portion which performs a function and has a shape capable of being inserted into a hole; a reference portion extended from the effective portion and formed substantially perpendicular to a center axis of the effective portion; and an aligning portion extended from the effective portion and formed around the effective portion.

Arranging the plurality of parts on the alignment jig may include; positioning each of the plurality of parts on each of a plurality of aligning reference portions; positioning an alignment guide jig above the plurality of parts at a predetermined height; each of the plurality of parts being self-centered on each of the plurality of aligning reference portions; and fixing the plurality of parts to the alignment jig.

Vibration may be applied to the alignment jig to promote self centering of the plurality of parts on the plurality of aligning reference portions.

Alternatively, or in addition, air may be blown out between the aligning reference portion and the part to promote self centering of the plurality of parts on the plurality of aligning reference portions.

The base plate may include a plurality of through holes, and bonding of the base plate to the plurality of parts may include aligning the plurality of through holes of the base plate with the plurality of parts on the alignment jig.

According to another aspect of the present invention, a manufacturing apparatus that bonds a plurality of parts to be centered during an assembly process to a base plate to form a wafer level parts assembly may include: an alignment jig having a plurality of aligning reference portions formed at regular intervals into which the plurality of parts is inserted and a plurality of air blowholes formed on a sidewall of each of the plurality of aligning reference portions; an air blower formed to blow out air through the plurality of air blowholes; and an alignment guide jig disposed above the alignment jig, the alignment guide jig having a plurality of reference projections formed on a bottom surface of the alignment guide jig facing the alignment jig and parallel to a top surface of the alignment jig to correspond to the plurality of aligning reference portions, wherein each of the plurality of parts may include: an effective portion which performs a function and has a shape capable of being inserted into each of the plurality of aligning reference portions; a reference portion extended from the effective portion and formed substantially perpendicular to a center axis of the effective portion; and an aligning portion extended from the effective portion and formed around the effective portion.

Other objects, advantages and features of the invention will become apparent from the following detailed description, which, taken in conjunction with the drawings, discloses exemplary embodiments of the invention.

BRIEF DESCRIPTION OF THE DRAWINGS

These and other aspects of the invention will become apparent and more readily appreciated from the following description of the exemplary embodiments, taken in conjunction with the accompanying drawings in which.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present invention will be described in detail with reference to the accompanying drawings.

The matters defined in the description, such as a detailed construction and elements thereof, are provided to assist in a comprehensive understanding of the invention. Thus, it is apparent that the present invention may be carried out without those defined matters. Also, well-known functions or constructions are omitted to provide a clear and concise description of exemplary embodiments of the present invention.

Exemplary embodiments of the present invention may be applied to various parts when a plurality of the part to be centered during an assembly process (for example, but not limited to, optical lenses) is assembled, the plurality of parts to be centered during the assembly process are required to be formed as a wafer level parts assembly.

For manufacturing a precise wafer level parts assembly, each of the plurality of parts to be centered during the assembly process may include an effective portion, a reference portion, and an aligning portion.

The effective portion performs a proper function of the part and may have a shape which may be inserted into a hole formed on a base plate. For example, when the part to be centered during the assembly process is an optical lens, the effective portion is a portion of the optical lens through which light passes. The reference portion of the part may be extended from the effective portion, and may be formed to be perpendicular to a center axis of the effective portion. The aligning portion may be extended from the effective portion and may be formed around the effective portion. The aligning portion may be formed around the effective portion to correspond to an alignment jig that allows the plurality of parts to be centered during the assembly process to be arranged at regular intervals. That is, the reference portion may be formed at portions of the part around the effective portion corresponding to the alignment jig.

Hereinafter, an optical lens is used as an example of the part to be centered during assembly process for convenience of explanation. However, exemplary embodiments of the present invention are not limited to the optical lens.

Figure 1:
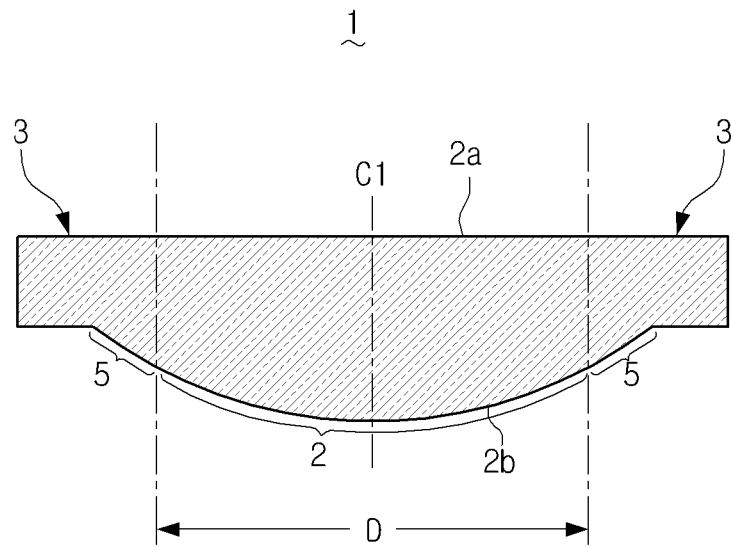
FIG. 1 is a sectional view illustrating a part to be centered during an assembly process according to an exemplary embodiment of the present invention.
Figure 2:
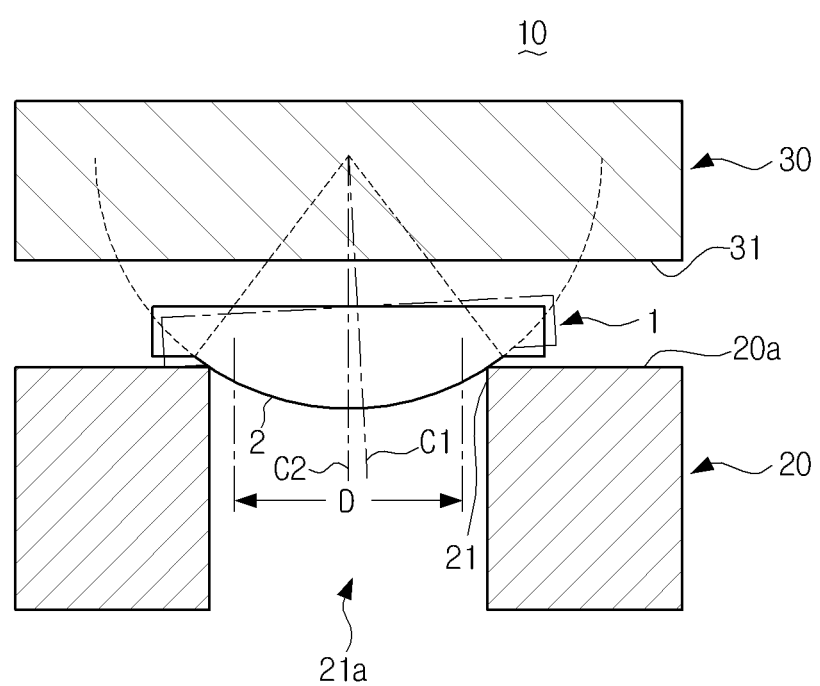
FIG. 2 is a sectional view illustrating an alignment jig on which a part to be centered during an assembly process according to an exemplary embodiment of the present invention is self-centered.

FIG. 1 is a sectional view illustrating an optical lens 1 as an example of the part to be centered during an assembly process according to an exemplary embodiment of the present invention. FIG. 2 is a sectional view illustrating an alignment jig 20 in which the optical lens 1 to be centered during an assembly process according to an exemplary embodiment of the present invention may be self-aligned.

Referring to FIG. 1, the optical lens 1 according to the exemplary embodiment of the present invention includes an effective portion 2, a reference portion 3, and an aligning portion 5.

The effective portion 2 is formed of a transparent material, through which light can pass, and has an entering surface 2a that light enters and an exit surface 2b that the light exits. The effective portion 2 allows the optical lens 1 to perform a specific optical function. The entering surface 2a and the exit surface 2b of the effective portion 2 are formed to have the required specific optical function. Also, referring to FIG. 2, the effective portion 2 may be formed in a shape to correspond to the shape of an aligning reference portion 21 of the alignment jig 20. The effective portion 2 may be formed in a smaller size than that of the aligning reference portion 21. For example, when the aligning reference portion 21 has a circular shape, the effective portion 2 may be formed so that a section of the effective portion 2 taken perpendicularly to a center axis C1, which passes through a center of the effective portion 2 in a light advancing direction (hereinafter, referred to an optical axis C1 of the effective portion 2), is a circle. The effective portion 2 may be formed to have a diameter D smaller than that of the aligning reference portion 21. In FIG. 2, the hole of the aligning reference portion 21 into which the effective portion 2 is inserted is not formed to have a bottom surface. Alternatively, the hole 21 of the alignment jig 20 may be formed to have a bottom surface.

Referring again to FIG. 1, the reference portion 3 may be formed to extend from the effective portion 2 and may be formed in a plane perpendicular to the optical axis C1 of the effective portion 2 in the light advancing direction. In FIG. 1, the reference portion 3 is formed as a plane to include the entering portion 2a of the effective portion 2. In other words, the optical lens 1 is formed so that one surface 2a of the optical lens 1 functions as the reference portion 3. The reference portion 3 may be a surface of the optical lens 1 to be bonded to the base plate 10 (see FIG. 2) as described below.

The aligning portion 5 may be formed so that when the optical lens 1 is put on the aligning reference portion 21 of the alignment jig 20 as illustrated in FIG. 2, the optical axis C1 of the effective portion 2 is aligned with the centerline C2 of the aligning reference portion 21. The aligning portion 5 may be extended from the effective portion 2. If the optical lens 1 is a concentric rotation member, the aligning portion 5 may be formed on a circumference based on the optical axis C1 of the effective portion 2. When the effective portion 2 of the optical lens 1, as illustrated in FIG. 2, is inserted into the aligning reference portion 21 of the alignment jig 20, the aligning portion 5 contacts an edge of the aligning reference portion 21 to be self-centered so the optical axis C1 of the effective portion 2 is aligned with the centerline C2 of the aligning reference portion 21.

The aligning portion 5 may be formed separately from the effective portion 2 around a periphery of the effective portion 2. Alternatively, the optical lens 1 may be designed so that some of the effective portion 2 is used as the aligning portion 5. In other words, the effective portion 2 of the optical lens 1 may be formed so that some of the effective portion 2 functions as the aligning portion 5.

The aligning portion 5 may be formed as an inclined surface at a portion of the optical lens 1 which contacts the edge of the aligning reference portion 21 when the optical lens 1 is inserted into the aligning reference portion 21 of the alignment jig 20 as illustrated in FIG. 2. When the inclined surface of the aligning portion 5 is a curved surface, the larger a curvature radius of the inclined surface, the less the optical lens 1 is sensitive to tilting. Therefore, after the optical lens 1 is aligned with the circular hole 21a of the alignment jig 20, the optical lens 1 is hard to be inclined. However, when the optical lens 1 is first put on the alignment jig 20, the optical axis C1 of the optical lens 1 is hard to be aligned with the centerline C2 of the aligning reference portion 21 of the alignment jig 20. Similarly, when the inclined surface of the aligning portion 5 is a flat surface, the smaller the slope of the inclined surface, the less the optical lens 1 is sensitive to tilting.

Figure 3:
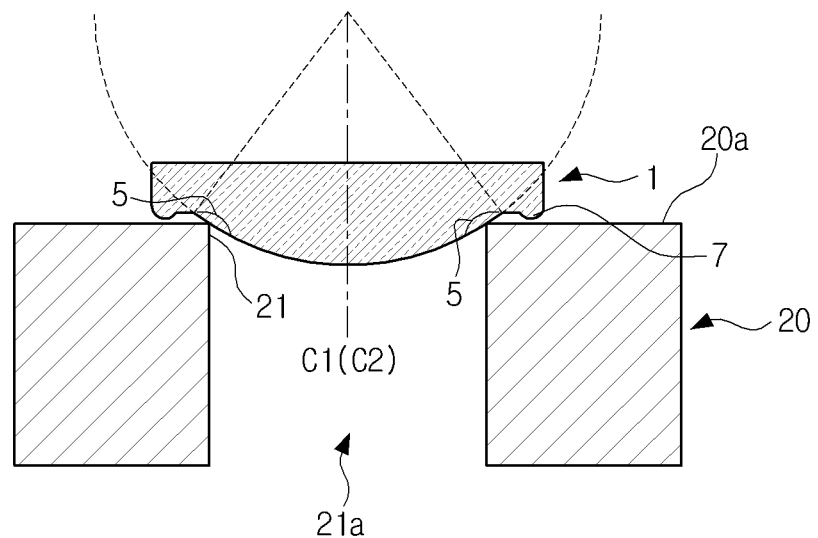
FIG. 3 is a sectional view illustrating a part to be centered during an assembly process according to another exemplary embodiment of the present invention that is aligned on an alignment jig.

As illustrated in FIG. 3, an optical lens 1 according to an exemplary embodiment of the present invention may include an inclination preventing portion 7. The inclination preventing portion 7 may be formed to minimize tilting of the optical lens 1 when the optical lens 1 is inserted into the aligning reference portion 21 of the alignment jig 20. In this embodiment, the inclination preventing portion 7 is formed around a periphery of the aligning portion 5 above a top surface 20a of the alignment jig 20. The inclination preventing portion 7, as illustrated in FIG. 3, may be formed as a curved surface projecting in a direction in which the optical lens 1 having a shape of a concentric rotation member is inserted into the aligning reference portion 21.

The optical lens 1 according to an exemplary embodiment of the present invention having the structure as described above may precisely be formed of a transparent material, such as a glass. When a mold for molding the optical lens 1 is machined using a concentric rotation member machining technique, such as a micro turning machining technique, the optical lens 1 may be formed to have eccentricity of approximately 1/100 μm or less.

Figure 4:
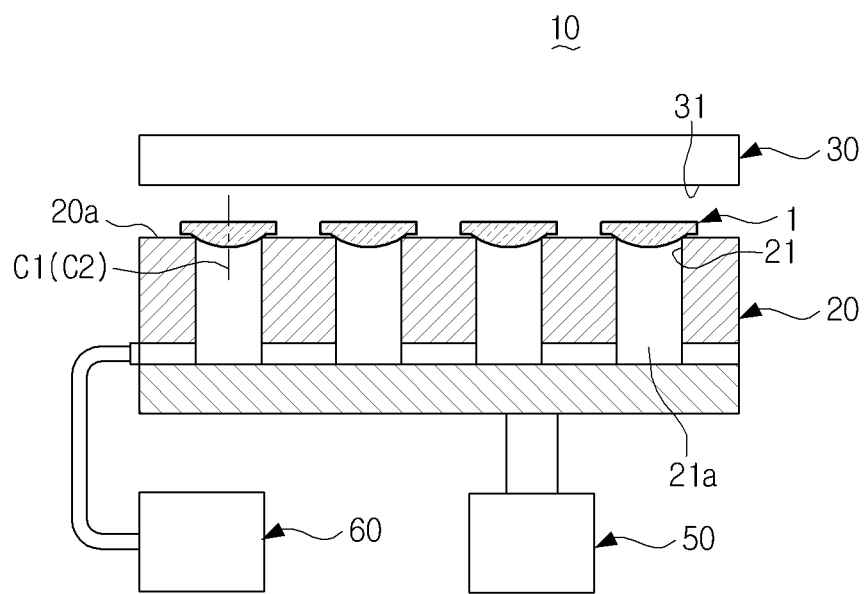
FIG. 4 is a view illustrating a manufacturing apparatus to manufacture a wafer level parts assembly according to an exemplary embodiment of the present invention.

FIG. 4 is a view illustrating a manufacturing apparatus 10 to manufacture a wafer level lenses assembly 110 (see FIG. 8) used to make a plurality of optical lenses 1 according to an exemplary embodiment of the present invention.

Referring to FIG. 4, the manufacturing apparatus 10 to manufacture a wafer level lenses assembly according to an embodiment of the present invention may include the alignment jig 20, an alignment guide jig 30, an alignment auxiliary apparatus 50, and a component fixing apparatus 60.

The alignment jig 20 may be formed to support the plurality of optical lenses 1 at regular intervals. Therefore, the alignment jig 20 has the plurality of aligning reference portions 21 formed at regular intervals to support the aligning portion 5 of the optical lens 1. Also, the top surface 20a of the alignment jig 20 may be formed as a flat surface perpendicular to the centerline C2 of each of the plurality of aligning reference portions 21. Therefore, when the optical lens 1 is inserted into the aligning reference portion 21 of the alignment jig 20, the optical axis C1 of the optical lens 1 is aligned with the centerline C2 of the aligning reference portion 21. The alignment jig 20 may be formed to have a size to correspond to the base plate 100 (see FIG. 8) of the wafer level lenses assembly 110 that will be manufactured, and the number of aligning reference portions 21 corresponding to the number of the optical lenses 1 consisting of the wafer level lenses assembly 110.

The aligning reference portion 21 may be formed so that the optical axis C1 of the optical lens 1 is automatically aligned with the centerline C2 of the aligning reference portion 21 by interaction between the aligning reference portion 21 and the aligning portion 5 of the optical lens 1, that is, the optical lens 1 is self-aligned with the aligning reference portion 21. For example, the aligning reference portion 21 of the alignment jig 20 may be formed as a circular shape corresponding to the aligning portion 5 of the optical lens 1. Referring to FIGS. 2 and 3, the aligning reference portion 21 of the alignment jig 20 is formed as a circular hole 21a and the corresponding aligning portion 5 of the optical lens 1 is formed as an inclined surface arranged on a circumference based on the optical axis C1 thereof.

Figure 5:
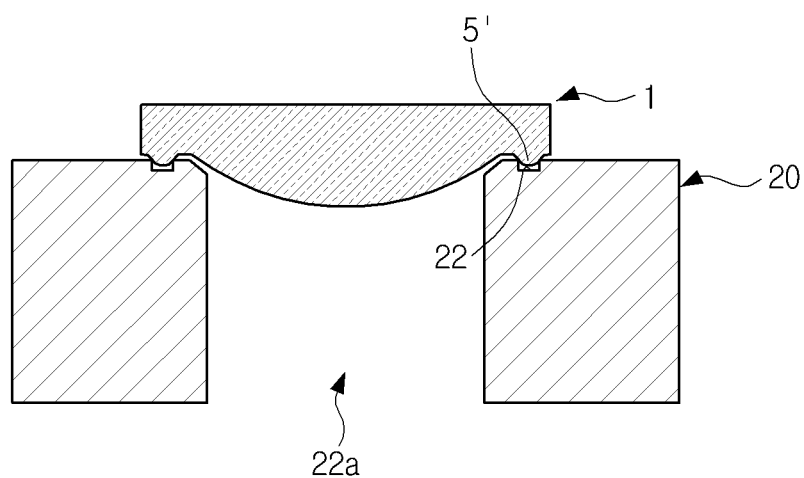
FIG. 5 is a sectional view illustrating an alignment jig to align a part to be centered during assembly process according to an exemplary embodiment of the present invention.

In an alternative exemplary embodiment, an aligning reference portion 22 of the alignment jig 20, as illustrated in FIG. 5, may be formed as a circular groove disposed around the circumference of the circular hole 22a. An aligning portion 5' of the optical lens 1 may be formed to have a shape that can be self-aligned by the aligning reference portion 22 of the circular groove shape.

Figure 6:
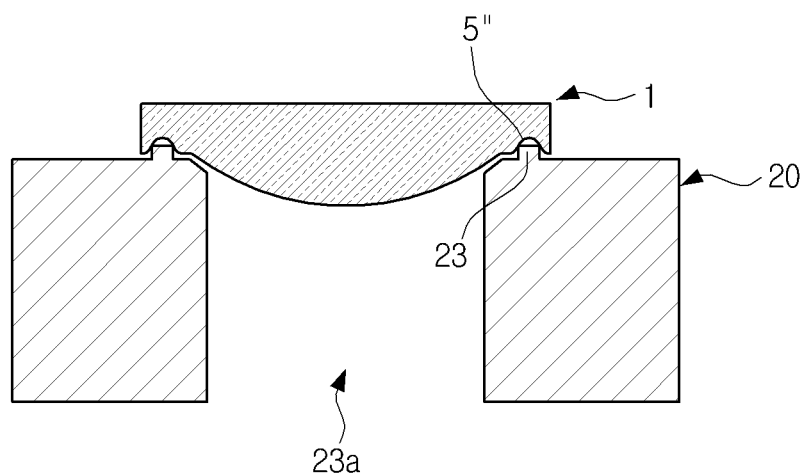
FIG. 6 is a sectional view illustrating an alignment jig to align a part to be centered during assembly process according to an another exemplary embodiment of the present invention.

In another alternative exemplary embodiment, an aligning reference portion 23 of the alignment jig 20, as illustrated in FIG. 6, may be formed as a circular protrusion disposed around the circumference of the circular hole 23a. An aligning portion 5" of the optical lens 1 may be formed to have a shape that can be self-aligned by the aligning reference portion 23 of the circular protrusion shape. That is, the aligning portion 5, 5', 5" of the optical lens 1 and the aligning reference portion 21, 22, and 23 of the alignment jig 20 may be formed as various shapes as long as the optical lens 1 is self-centered by the interaction between the aligning reference portion 21, 22, and 23 of the alignment jig 20 and the aligning portion 5, 5', and 5" of the optical lens 1 so that the optical axis C1 of the optical lens 1 is mechanically aligned with the centerline C2 of the aligning reference portion 21, 22, and 23.

Since the plurality of optical lenses 1 of the wafer level lenses assembly 110 is formed to have precise intervals therebetween, the plurality of aligning reference portions 21 of the alignment jig 20 may be formed to have high accuracy to correspond to the interval accuracies among the plurality of optical lenses 1 of the wafer level lenses assembly 110. The wafer level lenses assembly 110 according to an exemplary embodiment of the present invention may have interval errors among the plurality of optical lenses 1 of 2 μm or less. For this end, geometric error (or shape error) of the plurality of aligning reference portions 21 of the alignment jig 20 may be minimized. In the exemplary embodiments of the present invention, machining techniques used to manufacture a semiconductor and exposure technique of a semiconductor manufacturing process may be used to make the alignment jig 20 to have such accuracy. A mask formed by the semiconductor manufacturing process may have a position accuracy of 1/100 μm or less on a plane. Therefore, if the plurality of aligning reference portions 21 of the alignment jig 20 is formed of photoresist by the semiconductor manufacturing process, the plurality of aligning reference portions 21 may have the geometric error of 1/100 μm or less. That is, the geometric error of the plurality of aligning reference portions 21 of the alignment jig 20 may be in a range between approximately 0 μm and approximately 1/100 μm.

Referring to FIG. 4, alignment guide jig 30 guides the plurality of optical lenses 1 so that top surfaces of the plurality of optical lenses 1 inserted into the plurality of aligning reference portion 21 of the alignment jig 20, for example, the entering surfaces 2a (see FIG. 1) of the optical lenses 1 are arranged parallel to the top surface 20a of the alignment jig 20. When the top surface of the optical lens 1 is parallel to the top surface 20a of the alignment jig 20, the optical axis C1 of the optical lens 1 is automatically aligned with the centerline C2 of the aligning reference portion 21. The alignment guide jig 30 is disposed above the alignment jig 20. A bottom surface 31 of the alignment guide jig 30 facing the alignment jig 20 is formed parallel to the top surface 20a of the alignment jig 20. The alignment guide jig 30 may be positioned above the alignment jig 20, during alignment of the parts, and positioned away from the alignment jig 20 to allow the base plate 100 (see FIG. 8) to be bonded to the plurality of optical lenses 1.

The alignment auxiliary apparatus 50 may promote the plurality of optical lenses 1 to be self-aligned so that each of the plurality of optical lenses 1 is precisely arranged in each of the plurality of aligning reference portions 21 of the alignment jig 20. The alignment auxiliary apparatus 50 may include an air blower, a vibrator, etc.

The vibrator may apply a vibration to the alignment jig 20 so that the alignment jig 20 vibrates at predetermined frequency and amplitude. When the alignment jig 20 vibrates, the optical lenses 1 inserted into the plurality of aligning reference portions 21 of the alignment jig 20 are self-aligned.

Figure 10A:
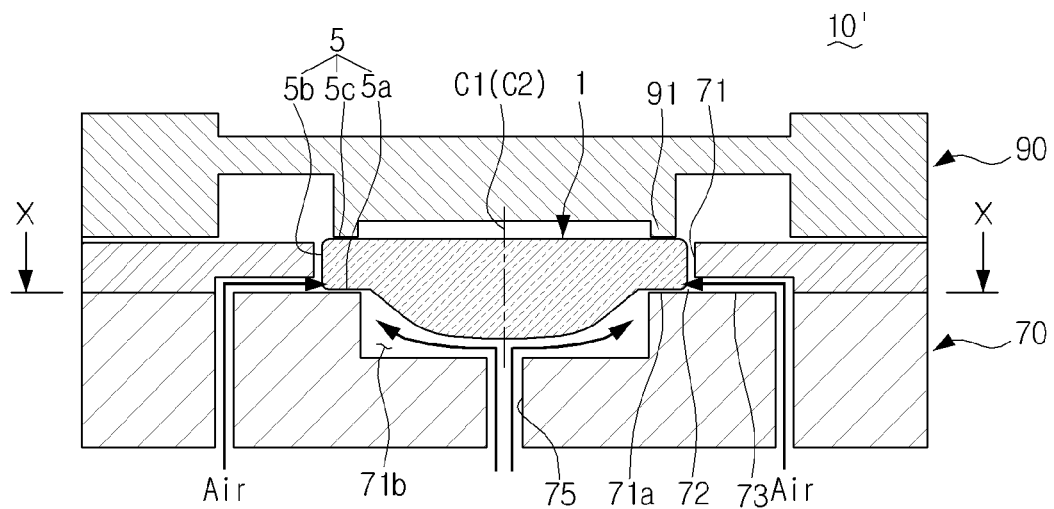
FIG. 10A is a view illustrating a manufacturing apparatus according to another exemplary embodiment of the present invention to manufacture a wafer level parts assembly.
Figure 10B:
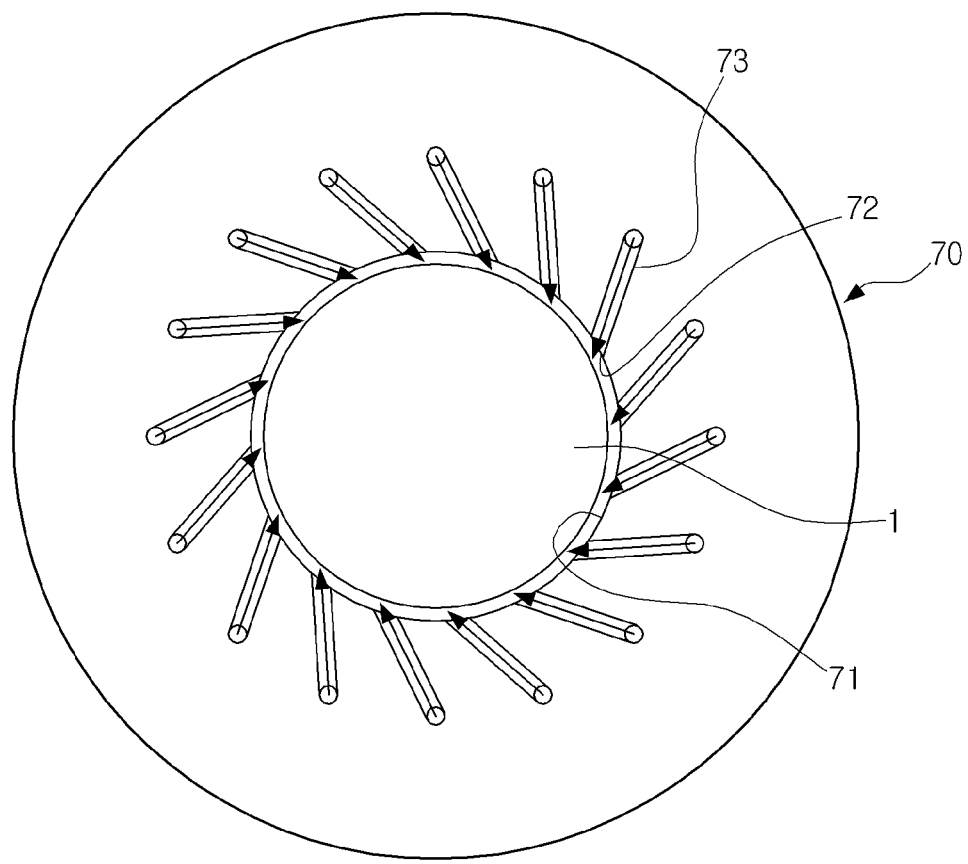
FIG. 10B is a sectional view illustrating the manufacturing apparatus taken along a line X-X in FIG. 10A.

FIGS. 10A and 10B illustrate an alignment jig 70 to allow the optical lens 1 to be self-aligned with an aligning reference portion 71 using an air blower as the alignment auxiliary apparatus 50. However, FIGS. 10A and 10B illustrate only one aligning reference portion among the plurality of aligning reference portions 71 of the alignment jig 70.

Referring again to FIG. 4, the component fixing apparatus 60 may be formed to fix the plurality of optical lenses 1, which is self-aligned and arranged with respect to the plurality of aligning reference portions 21 of the alignment jig 20, to the alignment jig 20. In this exemplary embodiment, a vacuum generator is used as the component fixing apparatus 60. The vacuum generator 60, as illustrated in FIG. 4, is in fluid communication with the plurality of circular holes 21a. Therefore, when after the plurality of optical lenses 1 is arranged on the aligning reference portions 21 of the alignment jig 20 and the vacuum generator 60 is operated, the insides of the circular holes 21a are placed under a vacuum so that the optical lenses 1 are fixed to the alignment jig 20.

The alignment jig 20, the alignment guide jig 30, the alignment auxiliary apparatus 50, and the component fixing apparatus 60 may be disposed on a frame (not illustrated) so they can perform functions thereof.

Hereinafter, a process to manufacture the wafer level lenses assembly 110 according to an exemplary embodiment of the present invention using the manufacturing apparatus 10 for the wafer level lenses assembly 110 as described above will be explained with reference to FIG. 4 and FIGS. 7A to 7D.

Figure 7A:
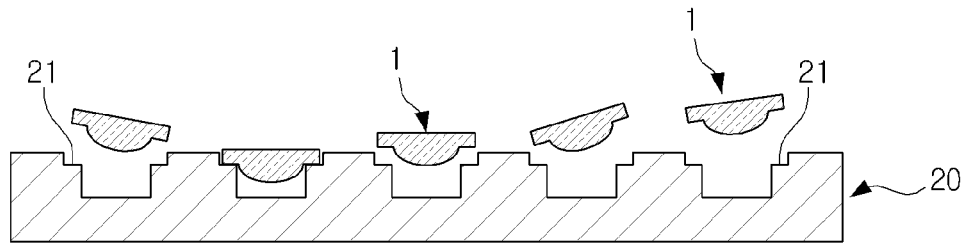
FIGS. 7A to 7D are views illustrating a method to manufacture a wafer level parts assembly according to an exemplary embodiment of the present invention.

As illustrated in FIG. 7A, the plurality of optical lenses 1 is positioned on the plurality of aligning reference portions 21 of the alignment jig 20 of the manufacturing apparatus 10 for the wafer level lenses assembly 110. After the plurality of optical lenses 1 is arrayed by an array apparatus (not illustrated), such as a sieve, etc., the plurality of optical lenses 1 may be picked up by a carrying apparatus (not illustrated) to grip at once many optical lenses, such as a pick and place apparatus, etc., and may be placed on the plurality of aligning reference portions 21 of the alignment jig 20.

Figure 7B:
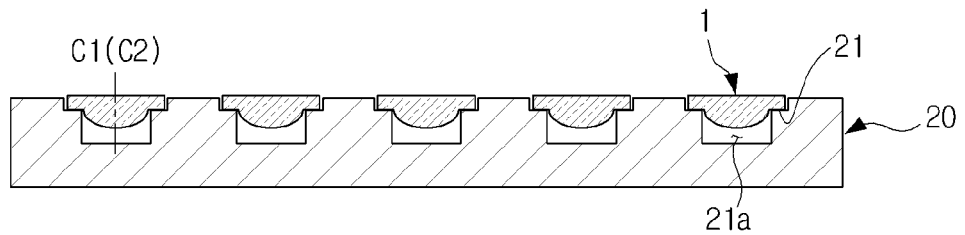

When the plurality of optical lenses 1 is placed on the aligning reference portions 21 of the alignment jig 20, as illustrated in FIG. 7B, the vibrator of the alignment auxiliary apparatus 50 applies a predetermined vibration to the alignment jig 20 and the optical axis C1 of each of the plurality of optical lenses 1 is effectively self-aligned with the centerline C2 of each of the plurality of aligning reference portions 21.

After that, the component fixing apparatus 60, that is, the vacuum generator is operated so that the plurality of optical lenses 1 is fixed to the alignment jig 20. When the vacuum generator 60 is operated, the insides of the circular holes 21a of the plurality of aligning reference portions 21 covered by the plurality of optical lenses 1 are placed under a vacuum so that the plurality of optical lenses 1 is fixed to the alignment jig 20.

Figure 7C:
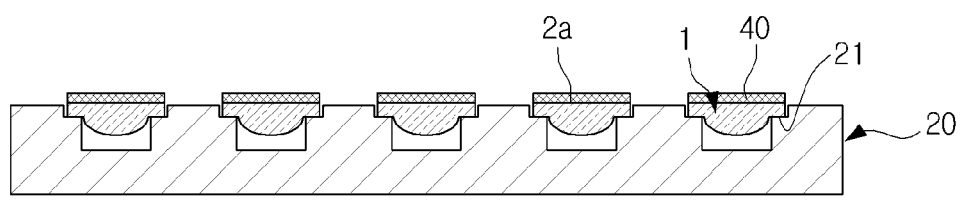

Next, as illustrated in FIG. 7C, an adhesive 40 may be applied to one surface of each of the plurality of optical lenses 1, that is, the surface of the optical lens 1 to be exposed toward the bottom surface 31 of the alignment guide jig 30, for example, the entering surface 2a of the optical lens 1. The adhesive 40 may be soft so that when the base plate 100 is bonded to the plurality of optical lenses 1, the force that the adhesive 40 applied to the plurality of optical lenses 1 does not cause the plurality of optical lenses 1 to shift from their fixed positions.

Figure 7D:
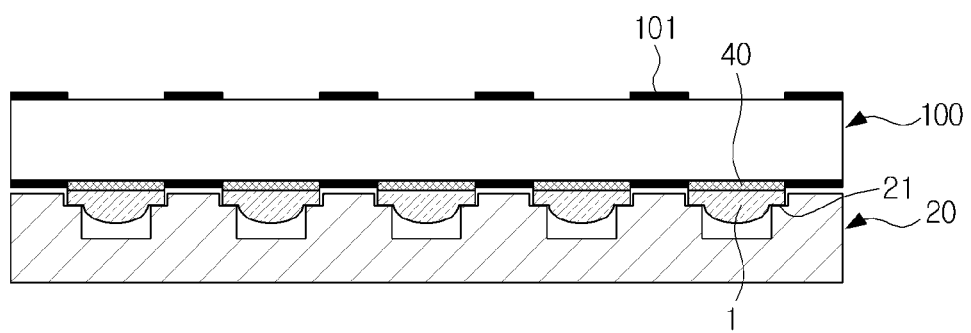
Figure 8:
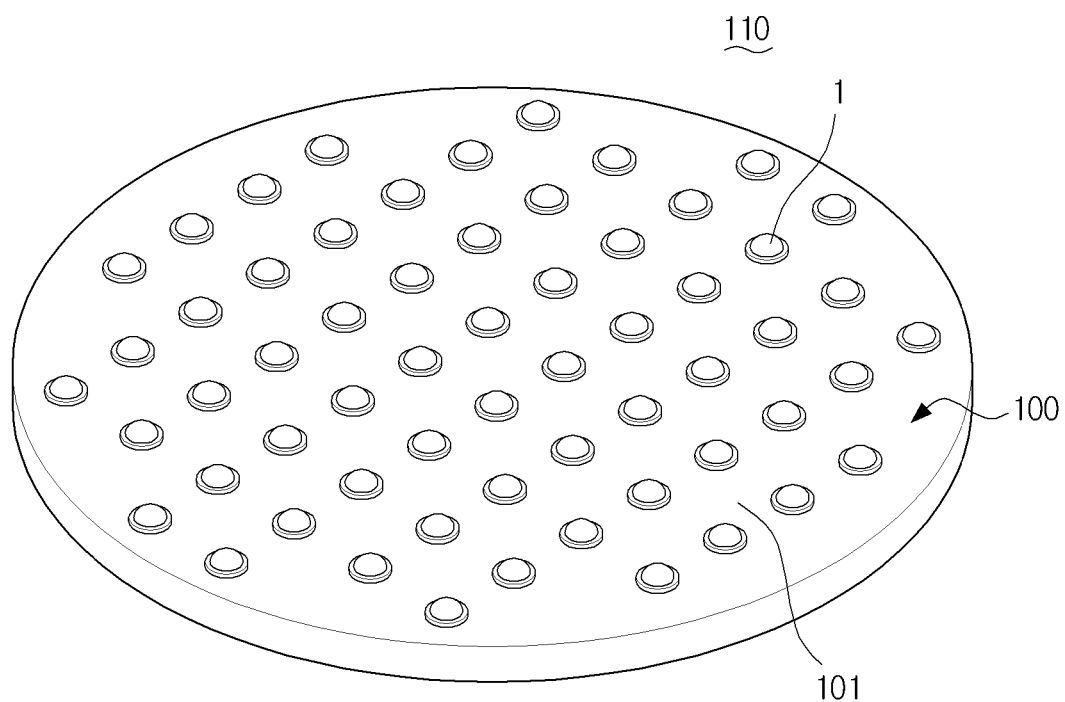
FIG. 8 is a perspective view illustrating a wafer level parts assembly according to an exemplary embodiment of the present invention.

After that, as illustrated in FIG. 7D, the base plate 100, which is manufactured in a separate process, is bonded to the plurality of optical lenses 1, completing the wafer level lenses assembly 110 according to an exemplary embodiment of the present invention. An example of the completed wafer level lenses assembly 110 is illustrated in FIG. 8. FIG. 8 is a perspective view illustrating the wafer level lenses assembly 110 of FIG. 7 that is separated from the alignment jig 20 and is turned over.

The base plate 100 may be formed to have size and shape corresponding to that of a wafer at which a plurality of image sensors is formed. The plurality of image sensors may be formed at a wafer level using the semiconductor manufacturing process. The base plate 100 may be formed of a transparent material through which light can pass. The base plate 100, as illustrated in FIGS. 7D and 8, may be formed as a circular plate. An opaque material, such as chrome, through which light cannot pass, may be applied to the portions 101 of the base plate 100 to which no optical lenses 1 are attached. Therefore, the light to pass through the effective portion 2 of the optical lens 1 can pass through the base plate 100. The base plate 100 may be formed of a glass or a transparent polymer.

Figure 9:
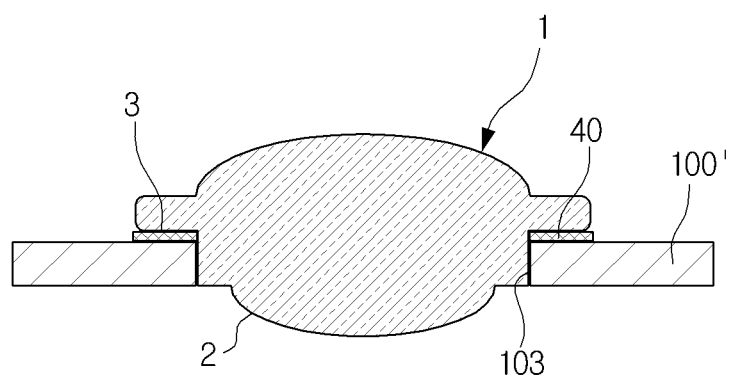
FIG. 9 is a sectional view illustrating a part to be centered during an assembly process according to an exemplary embodiment of the present invention that is assembled in a through hole of a base plate.

FIG. 9 is a partial sectional view illustrating a base plate 100' according to another exemplary embodiment. Referring to FIG. 9, the base plate 100' is provided with a plurality of through holes 103 into which the effective portion 2 of the optical lens 1 can be inserted. The plurality of through holes 103 may be formed at regular intervals to correspond to the plurality of image sensors formed in a wafer level. Before the optical lens 1 is inserted into the through hole 103 of the base plate 100', the adhesive 40 is applied to the reference portion 3 of the optical lens 1 formed around the effective portion 2 of the optical lens 1. The base plate 100' has the through holes 103 allowing light to pass through the optical lens 1, but not to pass through the base plate 100'. In this case, when the optical lens 1 is designed, reflection of light by the base plate 100' does not need to be considered.

FIGS. 10A and 10B are views illustrating a manufacturing apparatus 10' to manufacture a wafer level parts assembly according to another exemplary embodiment of the present invention. FIGS. 10A and 10B illustrate one optical lens 1 for convenience.

Referring to FIG. 10A, the manufacturing apparatus 10' of the wafer level lenses assembly 110 according to another exemplary embodiment of the present invention may include an alignment jig 70 and an alignment guide jig 90.

The alignment jig 70 is formed to use an air blower for self-centering of the optical lens 1. That is, the aligning reference portion 71 of the alignment jig 70 is formed as a circular hole to have a stepped portion 71a into which the optical lens 1 can be inserted. Also, a plurality of air blowholes 72 to blow out air is formed on a sidewall of the aligning reference portion 71.

A plurality of air passages 73 connected with the plurality of air blowholes 72, as illustrated in FIG. 10B, is inclined so that air is blown out in an inclined direction with respect to the optical lens 1. The plurality of air passages 73 is connected with an air blower (not illustrated) to blow out air by a predetermined pressure. Also, an air hole 75 through which air enters the circular hole 71b or the air within the circular hole 71b is discharged may be formed on the bottom surface of the circular hole 71b.

The aligning portion 5 of the optical lens 1, as illustrated in FIG. 10A, may be formed to include first and second surfaces 5a and 5c perpendicular to the optical axis C1 of the optical lens 1 and a third surface 5b parallel to the optical axis C1. The third surface 5b of the optical lens 1 allows the optical axis C1 of the optical lens 1 to be aligned with the centerline C2 of the aligning reference portion 71 by the air blown from the plurality of air blowholes 72. The second surface 5c of the optical lens 1 is contacted by a reference projection 91 of the alignment guide jig 90 so as to prevent the optical lens 1 from inclining with respect to the aligning reference portion 71. Therefore, when the optical lens 1 is inserted into the circular hole 71b and the plurality of air blowholes 72 blow out air, the optical lens 1 is self-centered without contacting the aligning reference portion 71 so that the optical axis C1 of the optical lens 1 is aligned with the centerline C2 of the aligning reference portion 71.

The alignment guide jig 90 is positioned above the alignment jig 70 so that while the optical axis C1 of the optical lens 1 is aligned, the alignment guide jig 90 restricts movement of the optical lens 1 for the optical lens 1 to maintain a predetermined position, and guides the optical lens 1 not to incline with respect to the aligning reference portion 71. The reference projection 91 of the alignment guide jig 90 guides the optical lens 1 that is rotated and self-centered by the blowing air, and is formed parallel to the top surface of the aligning reference portion 71 of the alignment jig 70. The alignment guide jig 90 may be formed by etching a silicon substrate.

Figure 11A:
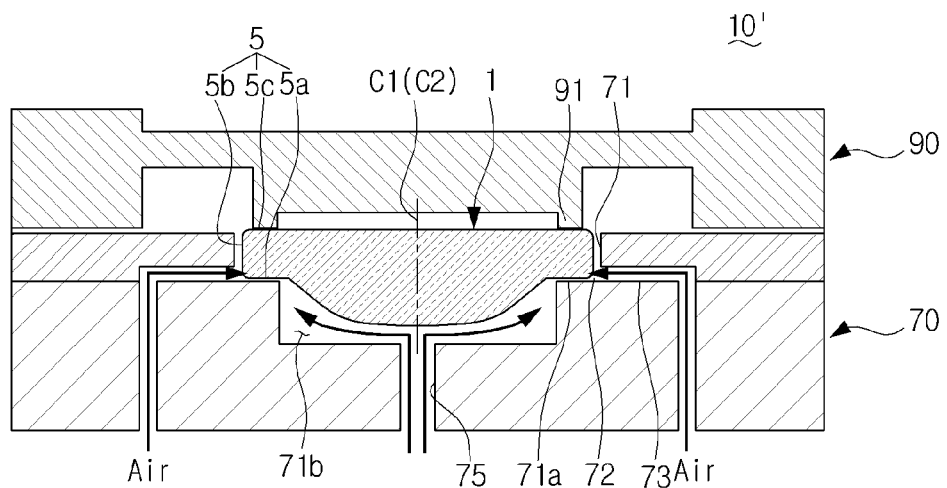
FIGS. 11A to 11C are views illustrating a method to manufacture a wafer level parts assembly using the manufacturing apparatus of FIG. 10A.
Figure 11B:
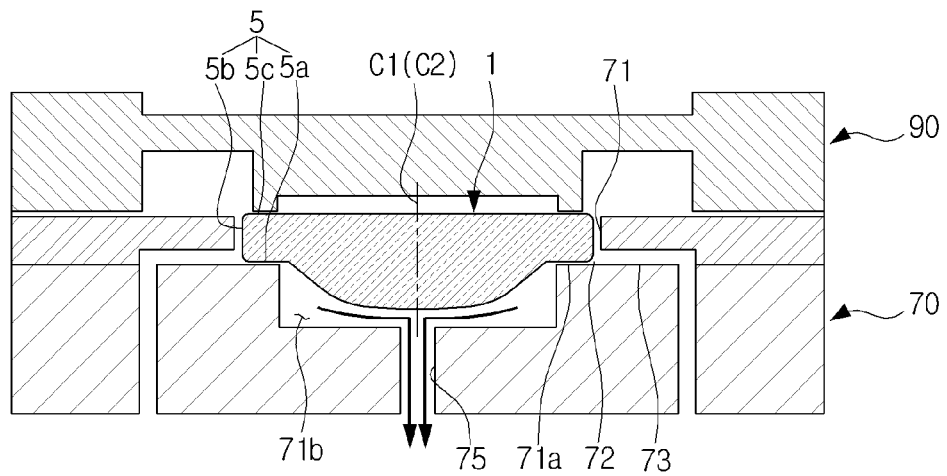
Figure 11C:
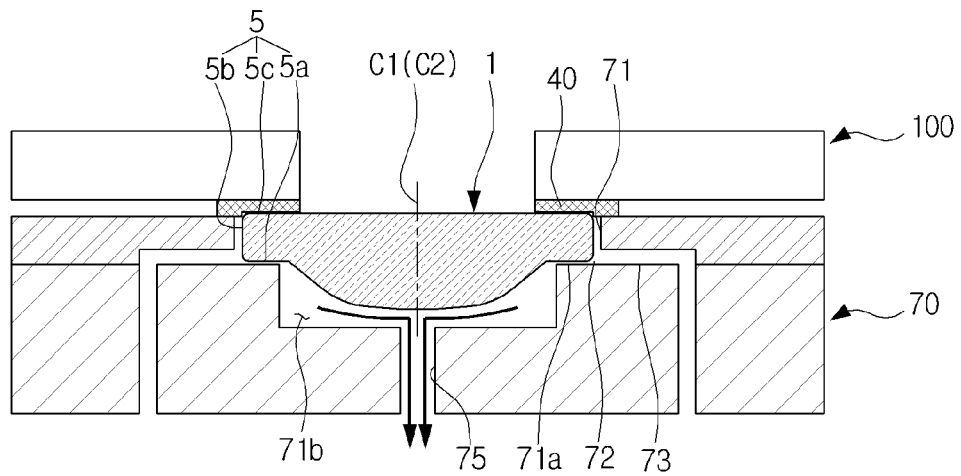

FIGS. 11A to 11C are views illustrating a method to manufacture a wafer level parts assembly using the manufacturing apparatus 10' for the wafer level lenses assembly 110 as described above.

As illustrated in FIG. 11A, when the optical lens 1 is inserted into the aligning reference portion 71, the first surface 5a of the aligning portion 5 of the optical lens 1 contacts the stepped portion 71a of the aligning reference portion 71. The first surface 5a of the aligning portion 5 of the optical lens 1 is precisely machined perpendicular to the optical axis C1 so that when the optical lens 1 is inserted into the aligning reference portion 71, the optical axis C1 of the optical lens 1 is not inclined with respect to the aligning reference portion 71 of the alignment jig 70. When air is blown out from the plurality of air blowholes 72 and the air hole 75, the optical axis C1 of the optical lens 1 is aligned with the centerline C2 of the aligning reference portion 71 by the third surface 5b of the aligning portion 5 of the optical lens 1. At this time, because the alignment guide jig 90 is above the optical lens 1, although the air is blown out from below the optical lens 1 so that the optical lens 1 does not contact the aligning reference portion 71, the optical lens 1 can maintain a predetermined height, can maintain an orientation parallel to the top surface of the aligning reference portion 71, and can be self-aligned with respect to the centerline C2 of the aligning reference portion 71.

After the optical lens 1 is self-aligned, the vacuum generator (not illustrated) connected with the air hole 75 as illustrated in FIG. 11B operates to place the inner space of circular hole 71b under a vacuum state so the optical lens 1 is temporally fixed to the alignment jig 70.

After that, as illustrated in FIG. 11C, the base plate 100 is bonded to the optical lens 1 using the adhesive 40. When the base plate 100 and the optical lens 1 are bonded to each other, a gap between the base plate 100 and the top surface of the alignment jig 70 maintains a predetermined value.

Figure 12A:
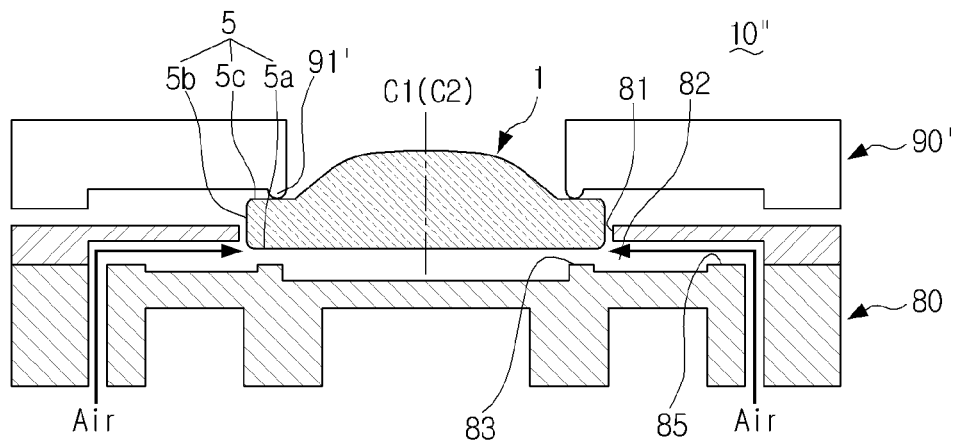
FIGS. 12A to 12C are views illustrating a method to manufacture a wafer level parts assembly using a manufacturing apparatus for the wafer level parts assembly according to another exemplary embodiment of the present invention.
Figure 12B:
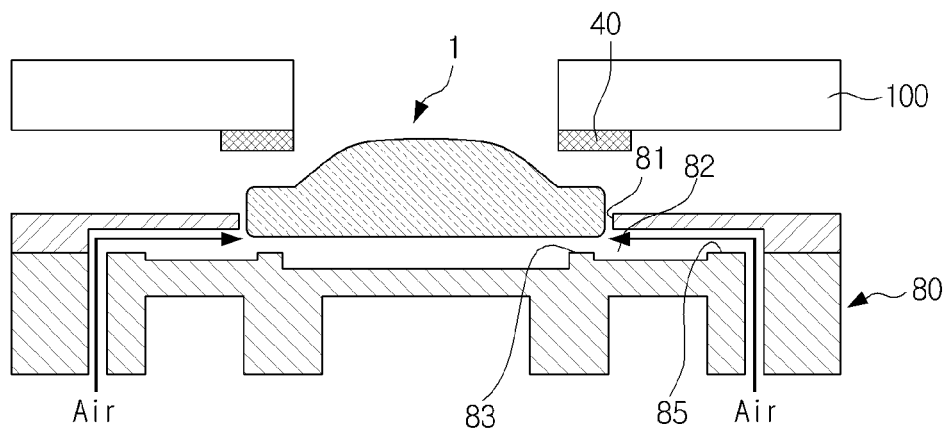
Figure 12C:
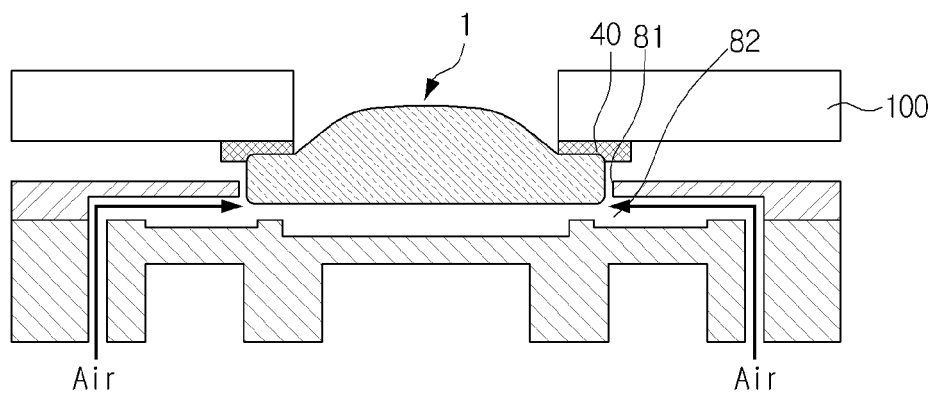

FIGS. 12A to 12C are views illustrating a method to manufacture a wafer level parts assembly using a manufacturing apparatus 10" for a wafer level lenses assembly 110 according to another exemplary embodiment of the present invention.

Referring to FIG. 12A, the manufacturing apparatus 10" of a wafer level lenses assembly according to another exemplary embodiment of the present invention may include an alignment jig 80 and an alignment guide jig 90'.

The alignment jig 80 and the alignment guide jig 90' may be formed to cause the optical lens 1 to be self-centered and to maintain a predetermined height in a non-contact status using an air blower (not illustrated).

The aligning reference portion 81 of the alignment jig 80 is formed as a circular hole with a closed bottom. A plurality of air blowholes 82 to blow out air is formed on a sidewall of the circular hole 81. A plurality of air passages 85 connected with the plurality of air blowholes 82 may be obliquely formed so that air is blown out in an inclined direction with respect to the optical lens 1 (see FIG. 10B). The plurality of air passages 85 of the alignment jig 80 is connected with an air blower (not illustrated).

The aligning portion 5 of the optical lens 1 may be formed to include first and second surfaces 5a and 5c perpendicular to the optical axis C1 of the optical lens 1 and a third surface 5b parallel to the optical axis C1. The third surface 5b of the optical lens 1 allows the optical axis C1 of the optical lens 1 to be aligned with the centerline C2 of the aligning reference portion 81 by the air blown from the plurality of air blowholes 82. The first and second surfaces 5a and 5c of the optical lens 1 prevent the optical lens 1 from inclining with respect to the aligning reference portion 81. Therefore, when the optical lens 1 is inserted into the circular hole 81 and the plurality of air blowholes 82 blows out air, the optical lens 1 is self-centered in a non-contact state with the aligning reference portion 81 so the optical axis C1 of the optical lens 1 is aligned with the centerline C2 of the aligning reference portion 81.

Also, the bottom surface 83 of the aligning reference portion 81 may be formed in a structure having a spring function to absorb a thickness deviation of each of the plurality of optical lens 1 to constitute of the wafer level lenses assembly 110. In this exemplary embodiment, the bottom surface 83 of the aligning reference portion 81, as illustrated in FIG. 12A, is formed in a shape similar to the leaf spring.

The alignment guide jig 90' is positioned above the alignment jig 80 so that while the optical axis C1 of the optical lens 1 is aligned by the blowing out air, the alignment guide jig 90' restricts movement of the optical lens 1 for the optical lens 1 to maintain a predetermined position, and guides the optical lens 1 not to incline with respect to the aligning reference portion 81. A reference projection 91' of the alignment guide jig 90' guides the second surface 5c of the optical lens 1 so that the optical lens 1 that is being rotated and self-centered by the blowing out air is not inclined. The reference projection 91' of the alignment guide jig 90' is formed parallel to the top surface of the aligning reference portion 81 of the alignment jig 80.

When the optical lens 1 is inserted into the aligning reference portion 81, a bottom surface of the optical lens 1 contacts the bottom surface 83 of the aligning reference portion 81. When air is blown out from the plurality of air blowholes 82, as illustrated in FIG. 12A, the optical axis C1 of the optical lens 1 is aligned with the centerline C2 of the aligning reference portion 81 by the reference portion 5 of the optical lens 1 in a state separated from the bottom surface 83 of the aligning reference portion 81.

After the optical lens 1 is arranged, as illustrated in FIG. 12B, while the air is blowing out, the alignment guide jig 90' is removed, and a base plate 100 to which an adhesive 40 is applied is positioned above the optical lens 1.

After that, as illustrated in FIG. 12C, while a bottom surface of the base plate 100 maintains parallel to the top surface of the alignment jig 80, the bottom surface of the base plate 100 is bonded to top surface of each of the plurality of optical lenses 1. When the base plate 100 and the plurality of optical lenses 1 are bonded to each other, a gap between the base plate 100 and the top surface of the alignment jig 80 maintains a predetermined value.

When the manufacturing apparatus 10' and 10" of the wafer level lenses assembly as illustrated in FIGS. 10A and 12A is used, in a state in which the part, such as an optical lens 1, does not contact the alignment jig 70 and 80, the optical axis C1 of the optical lens 1 is aligned with the centerline C2 of the aligning reference portion 71 and 81 of the alignment jig 70 and 80. Also, in the manufacturing apparatus to blowing out air for the part to be self-aligned like the manufacturing apparatus 10' and 10" of the wafer level lenses assembly as described above, the part rotates based on a center axis thereof. Therefore, the manufacturing apparatus may be used to form a wafer level parts assembly using parts to have a circle section perpendicular to the center axis thereof.

Figure 13:
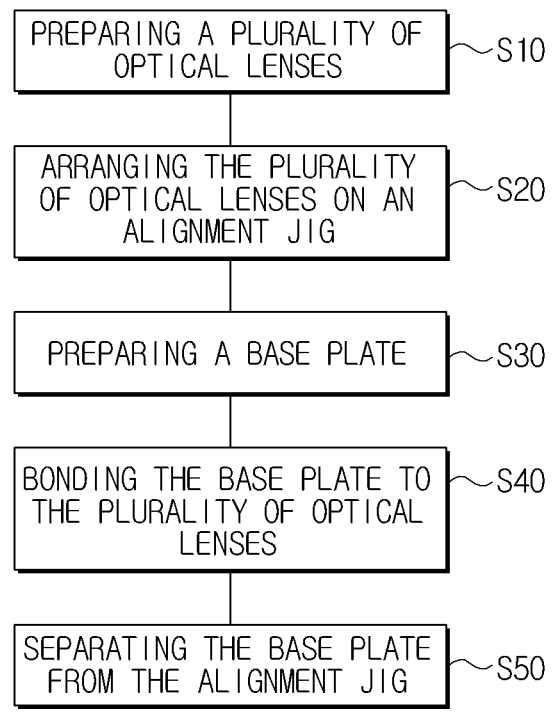
FIG. 13 is a flow chart illustrating a method to manufacture a wafer level parts assembly according to an exemplary embodiment of the present invention.

Hereinafter, a method to manufacture a wafer level lenses assembly according to an exemplary embodiment of the present invention will be explained with reference to FIGS. 2, 4, and 13.

First, a plurality of optical lenses 1 according to an exemplary embodiment of the present invention is prepared (S10). That is, the plurality of optical lenses 1 to have a shape that can be self-centered by the alignment jig 20 is prepared.

Then the plurality of optical lenses 1 is arranged on the alignment jig 20 of the manufacturing apparatus 10 of the wafer level lenses assembly (S20).

A method to arrange the plurality of optical lenses 1 on the alignment jig 20 will now be explained in detail.

First, the prepared plurality of optical lenses 1 is positioned on each of the plurality of aligning reference portions 21 of the alignment jig 20. When the alignment guide jig 30 is positioned above the plurality of optical lenses 1 at a predetermined height from the top surface of the alignment jig 20, the plurality of optical lenses 1 is self-centered so that the optical axis C1 of each of the plurality of optical lenses 1 is aligned with the centerline C2 of the aligning reference portion 21. A vibrator 50 applies vibration to the alignment jig 20, and the plurality of optical lenses 1 is effectively self-centered. Also, the air blower blows out air for the optical axis C1 of the optical lens 1 to be aligned with the centerline C2 of the aligning reference portion 21.

After the plurality of optical lenses 1 is self-centered, the plurality of optical lenses 1 is fixed to the alignment jig 20 so as not to move with respect to the alignment jig 20. Because fixture of the plurality of optical lenses 1 with respect to the alignment jig 20 is temporary, a vacuum generator may be used to fix the plurality of optical lenses 1 to the alignment jig 20.

Next, a base plate 100 to be bonded to the plurality of optical lenses 1 is prepared (S30). The base plate 100 may be formed in a process separate from the process in which the optical lens 1 is molded.

After that, the base plate 100 is bonded to the plurality of optical lenses 1 arranged on the alignment jig 20 (S40). The base plate 100 and the plurality of optical lenses 1 are bonded to each other using an adhesive 40.

After the adhesive 40 between the base plate 100 and the plurality of optical lenses 1 cures, the plurality of optical lenses 1 is released from the alignment jig 20, and the base plate 100 is separated from the alignment jig 20 (S50), completing the wafer level lenses assembly 110.

Figure 14A:
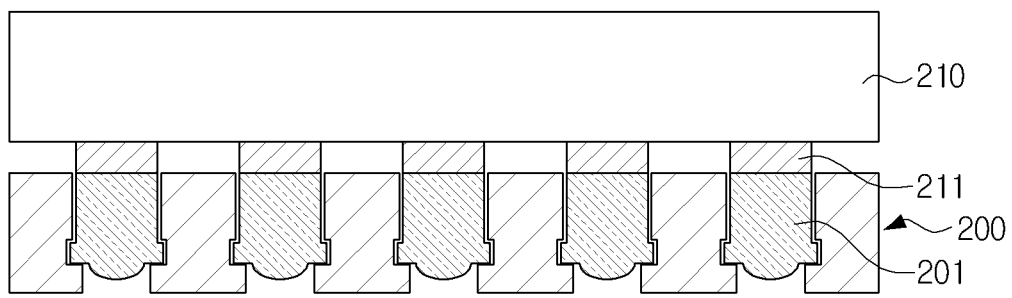
FIG. 14A is a view illustrating an apparatus to make a master lens mold array formed by applying a manufacturing apparatus of a wafer level parts assembly according to an exemplary embodiment of the present invention.

In the above description, the wafer level lenses assembly 110 in which the plurality of optical lenses 1 is arranged on the base plate 100 at regular intervals is described. However, the present invention is not limited to the optical lens 1. The embodiments of present invention may be applied to various cases where a plurality of parts needs to be arranged on a flat plate at regular intervals to form an interim product. FIG. 14A is a view illustrating an apparatus to make a master lens mold array 220 as illustrated in FIG. 14B using a plurality of lens molds 201 to mold the optical lens 1, to which the present invention is applied.

Referring to FIG. 14A, the plurality of lens molds 201 for molding the optical lens 1 is inserted into an alignment jig 200, and a base plate 210 is positioned above the plurality of lens molds 201. At this time, the plurality of lens molds 201 may be fixed to the base plate 210 by a magnet 211.

Figure 14B:
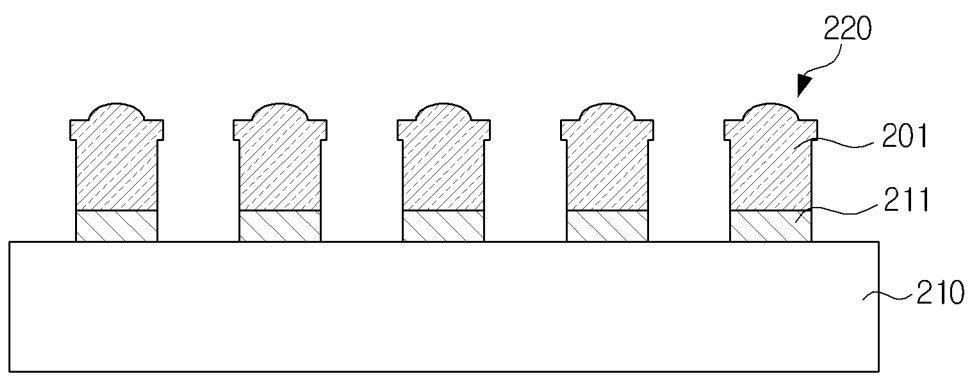
FIG. 14B is a side view illustrating a master lens mold array manufactured using the apparatus of FIG. 14A.

Referring to FIG. 14B, the plurality of lens molds 201 fixed to the base plate 210 is separated from the alignment jig 200. The plurality of lens molds 201 fixed to the base plate 210 may be used as a master lens mold array 220 to form a plurality of optical lenses 1 at once.

While the embodiments of the present invention have been described, additional variations and modifications of the embodiments may occur to those skilled in the art once they learn of the basic inventive concepts. It will be understood by those skilled in the art that various changes in form and details may be made therein without departing from the spirit and scope of the invention as defined by the appended claims. Therefore, it is intended that the appended claims shall be construed to include both the above embodiments and all such variations and modifications that fall within the spirit and scope of the invention.

What is claimed is:

1. A part to be centered during assembly process, the part comprising:
    an effective portion which performs a function and is shaped for insertion into a hole;
    a reference portion extended from the effective portion and formed substantially perpendicular to a center axis of the effective portion;
    an aligning portion extended from the effective portion and formed around the effective portion; and
    an inclination preventing portion formed as a convex curved surface projecting from a periphery of the aligning portion in a direction in which the part is inserted into the hole and to prevent the part from inclining,
    wherein a height from the reference portion to a bottom surface of the inclination preventing portion is smaller than a height from the reference portion to a boundary between the effective portion and the aligning portion.

2. The part of claim 1, wherein the aligning portion is formed around a periphery of the effective portion.

3. The part of claim 1, wherein at least part of the effective portion functions as the aligning portion.

4. The part of claim 1, wherein the aligning portion comprises an inclined surface formed at a portion of the part which contacts an edge of the hole when the part is inserted into the hole.

5. The part of claim 1, wherein the aligning portion is formed on a top surface of the part.

6. The part of claim 1, wherein the part comprises an optical lens.

7. A wafer level parts assembly, comprising:
    a base plate formed in a size and shape of a wafer having a plurality of through holes formed by regular intervals; and
    a plurality of parts inserted into the plurality of through holes and bonded to the base plate,
    wherein each of the plurality of parts comprises;
    an effective portion positioned either above the through hole or within the through hole;
    a reference portion extended from the effective portion and formed substantially perpendicular to a center axis of the effective portion;

an aligning portion extended from the effective portion and formed around the effective portion; and an inclination preventing portion formed as a convex curved surface projecting from a periphery of the aligning portion in a direction in which the part is inserted into the hole and to prevent the part from inclining, wherein a height from the reference portion to a bottom surface of the inclination preventing portion is smaller than a height from the reference portion to a boundary between the effective portion and the aligning portion, and wherein the reference portion is bonded to a top surface of the base plate and an upper part of the effective portion projects from the base plate.

8. A manufacturing apparatus that bonds a plurality of parts to a base plate to form a wafer level parts assembly, each of the plurality of parts comprising:

an effective portion which performs a function and is shaped for insertion into a hole; a reference portion extended from the effective portion and formed substantially perpendicular to a center axis of the effective portion; and an aligning portion extended from the effective portion and formed around the effective portion, the manufacturing apparatus comprising:

an alignment jig formed in a size and shape of a wafer and having a plurality of aligning reference portions formed at regular intervals to support the aligning portions of the parts to be centered and a top surface formed in a plane perpendicular to centerlines of the plurality of aligning reference portions; and an alignment guide jig formed in a size and shape of a wafer and positioned above the alignment jig during alignment of the parts, wherein a bottom surface of the alignment guide jig that faces the reference portion of the each of the parts supported by the alignment jig is parallel to the top surface of the alignment jig and is spaced apart from the top surface of the alignment jig, and wherein the alignment guide jig is positioned away from the alignment jig when bonding the parts to the base plate.

9. The manufacturing apparatus of claim 8, wherein the alignment jig is made by an exposure technique of a semiconductor manufacturing process.

10. The manufacturing apparatus of claim 8, wherein the aligning reference portion of the alignment jig is formed of photoresist.

11. The manufacturing apparatus of claim 8, wherein the plurality of parts is molded by a part mold made using a concentric rotation member turning machining technique.

12. The manufacturing apparatus of claim 8, further comprising:

a component fixing apparatus which fixes the plurality of parts arranged on the alignment jig to the alignment jig.

13. The manufacturing apparatus of claim 8, further comprising:

an alignment auxiliary apparatus for aiding self alignment of the plurality of parts on the plurality of aligning reference portions of the alignment jig.

14. The manufacturing apparatus of claim 13, wherein the alignment auxiliary apparatus comprises at least one of an air blower and a vibrator.

15. A manufacturing apparatus that bonds a plurality of parts to be centered during assembly process to a base plate to form a wafer level parts assembly, the manufacturing apparatus comprising:

an alignment jig having a plurality of aligning reference portions formed at regular intervals into which the plurality of parts is inserted, and a plurality of air blowholes formed on a sidewall of each of the plurality of aligning reference portions;

an air blower which blows out air through the plurality of air blowholes; and an alignment guide jig disposed above the alignment jig, wherein the alignment guide jig has a plurality of reference projections formed on a bottom surface of the alignment jig facing the alignment jig parallel to a top surface of the alignment jig corresponding to the plurality of aligning reference portions, wherein each of the plurality of parts comprises:

an effective portion which performs a function and is shaped for insertion into a hole;

a reference portion extended from the effective portion and formed substantially perpendicular to a center axis of the effective portion; and an aligning portion extended from the effective portion and formed around the effective portion.

\* \* \* \* \*